ELECTROMAGNETIC METERING PUMP

The present invention relates to apparatus for use in liquid chromatography and has as an object the provision of improved pumping apparatus for passing the liquid through a chromatographic column containing an adsorption agent.

In liquid chromatography, the liquid is usually passed through the column continuously at a low rate of flow. In low pressure chromatography the very low constant rate of flow is obtained by a simple hydrostatic arrangement in which the liquid is supplied from a header tank. In high pressure chromatography a pump is used to force the liquid through the column at the desired pressure, for example from 100 to 200 atmospheres. For example, a pump is used which has a piston which is moved gradually by a cam in the forward direction and quickly returned. In order to alter the speed of operation a control device must be provided between the motor and the cam. Because of their complex construction pumps of this type are expensive.

By the present invention, there is provided apparatus for pumping a liquid through a chromatographic column filled with an adsorption agent in liquid chromatography, said apparatus comprising an electromagnetic metering pump, having an intake for said liquid and an outlet for said liquid, operable to take in said liquid at said intake and deliver it in a pulsed and pressurized flow at said outlet, connecting means for connecting said outlet with the column and, in said connecting means, a pulsation damping device in the form of a sealed chamber having a resiliently loaded elastic wall.

Metering pumps as used in the present apparatus have been used previously for introducing an exact selected amount of an additive, for example a water softening agent or a coagulating agent, into a stream of water or other liquid. Typically, the metering pump consists of pumping diaphragm and an electromagnet with a central armature fitted with a return spring. The electromagnet is energised by electrical impulses, and on each impulse the pumping diaphragm is moved to and fro. The rate of pumping the additive is controlled by adjusting the stroke of the armature and/or the impulse frequency. The use of such a pump in accordance with the present invention leads to the apparatus being relatively inexpensive. With the apparatus, low pressure chromatography can be carried out more quickly than when the liquid is supplied to the column hydrostatically, and yet still economically.

With the apparatus, a satisfactory chromatographic separation of the different components of the mixture being processed is obtained. Used by itself, the metering pump yields a completely unsatisfactory chromatographic spectrum but it is found that, simple as it is, the said pulsation damping device is effective to give good chromatographic separation of the constituents of the mixture being processed.

The ingress of air to the chamber is found to have an undesirable influence and should not be permitted.

To provide wide versatility in operation, the apparatus may be provided with an adjustable power supply for actuating the metering pump, for example an electric impulse generator of variable impulse frequency. In this way an adjustment of power, even a very exact adjustment of power, can be obtained for the particular conditions. For example, one can, in order to get the optimum speed of operation, adjust the power depending on the amount of the material involved, the viscosity of the liquid and similar factors.

The spring loading of the elastic wall is preferably adjustable so that the pressure in the chamber can be adjusted as required. Satisfactory results are maintained.

A very simple construction enabling the load pressure to be adjusted and changes in the rate of delivery to be reduced to a negligible value is obtained if the elastic wall is loaded by means of a mechanical spring, conveniently a coil spring. Alternatively, or additionally, a gas under pressure may be used to give very fine adjustment both up and down.

Advantageously the sealed chamber is provided with a valve adapted to maintain the pressure in the chamber above a selected minimum value. When, on account of the smallness of the quantity of the liquid, and/or the low value of its viscosity, the pumping pressure cannot be maintained at a value in excess of this minimum pressure, the non-return valve ensures that sufficient pressure to distend the pliable wall of the chamber is maintained.

In a preferred form of the apparatus, a pressure gauge connected with the chamber, is provided to measure the pressure in the chamber. Advantageously closable venting means is provided beyond the gauge so that the chamber may be vented to atmosphere via the gauge. The pressure gauge permits a very simple control and selection of the pressure in the chamber. If air gets into the pressure gauge branch after venting to atmosphere, then the branch can be rinsed through with liquid from the chamber.

Preferably the metering pump has a pumping diaphragm which is moved in one direction by the armature of an electromagnet and returned by a spring. This leads to an especially cheap and robust construction of metering pump. Ideally the stroke of the armature is limited by an adjustable stop. By choice of stroke and/or impulse frequency the pump can be set to suit the particular circumstances.

The metering pump and pulsation damping apparatus may be mounted in a common housing with the connections between the two contained within the housing. This arrangement gives a ready made unit merely requiring the connection of a reservoir.

The invention further provides a process for separating the constituent materials of a mixture using a chromatographic column and an eluent liquid which comprises pumping the eluent liquid by an electromagnetic metering pumping means to form a pulsed flow of said eluent, passing the pulsed flow of eluent via a chamber to an outlet, exposing the eluent whilst in the chamber to a resiliently loaded elastic wall, withdrawing a substantially damped flow of eluent from the chamber, passing said withdrawn flow into one end of the column and thence through said column to provide a stream of eluent through the column and continuing to provide said stream through the column until the materials of said mixture are substantially separated from one another in the direction of said stream.

The outer surface of the said elastic wall is preferably in communication with the atmosphere.

The following description of preferred embodiments of the invention, in which reference is made to the accompanying drawing, is given in order to illustrate the invention. In the drawing:

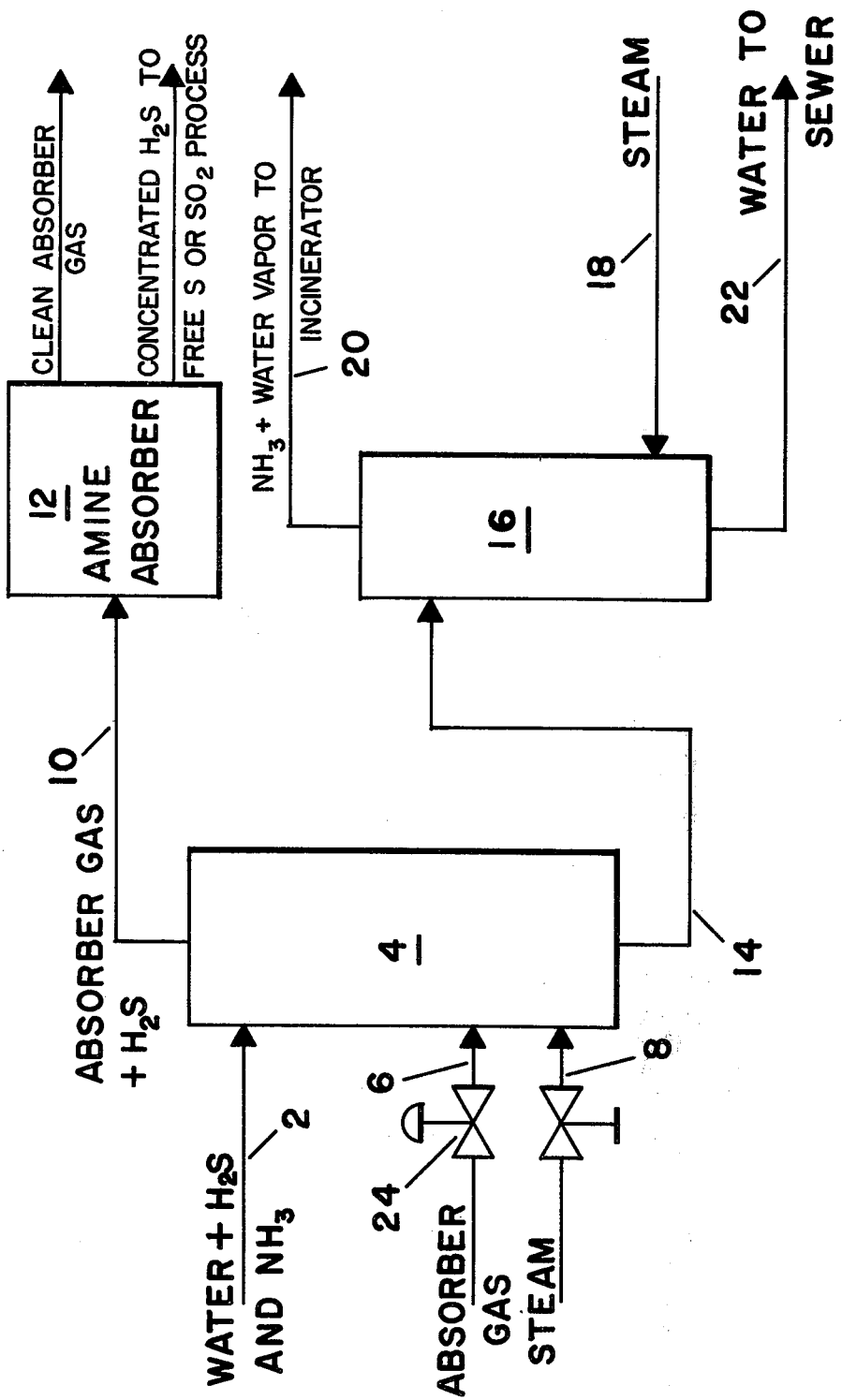

TREATING FOUL REFINERY WASTE WATERS WITH ABSORBER GAS

NATURE OF INVENTION

The removal of hydrogen sulfide and ammonia from foul process water prior to disposal of the warter has long been commonplace in petroleum refineries. The customary disposal technique has been to strip the foul water with steam by introducing steam at the bottom of one or more contacting columns and flowing it upwards through a descending stream of foul process water. Subsequently, the ammonia and hydrogen sulfide gases removed overhead are incinerated.

In numerous instances within the past several years, however, the mixture of hydrogen sulfide and ammonia gases removed has not been directly incinerated because of air pollution problems. Instead, the gases have been directed to a sulfur recovery system such as a Claus plant wherein the hydrogen sulfide is converted to free sulfur and water vapor. Most of these systems utilize a bauxite catalyst. The quantity of ammonia in the gas mixture fed to the sulfur recovery system originally was not considered to be a problem but ammonia (in the form of ammonium salts) has been determined to be a catalyst poison causing decreased recoveries of free sulfur. Reduced efficiency of the sulfur recovery system creates further problems in that the effluent gases contain hydrogen sulfide and/or sulfur dioxide in quantities sufficient to create air pollution problems. The presence of ammonia in feed gas flowing to a sulfur recovery plant also reduces its hydrogen sulfide handling capacity.

An example of a foul water treating system is described in Hydrocarbon Processing, Volume 51, No. 10, October 1972. In this process, water degassed of dissolved hydrogen, methane, and other light hydrocarbons is pumped into a reboiler stripping column where hydrogen sulfide is stripped overhead while water and ammonia flow downwards and out of the column as the bottoms product. The overhead product is a high purity hydrogen sulfide directly suitable as sulfur or sulfuric acid plant feed. The bottoms product from the first column is fed directly to a second reboiler stripper column which produces a clean water bottoms substantially free of hydrogen sulfide and ammonia. The overhead is taken to an ammonia purification system. This publication notes the importance of removing ammonia from a hydrogen sulfide gas stream before the latter is fed to a sulfur or sulfuric acid conversion unit.

Most of the current processes for removing ammonia and hydrogen sulfide from foul refinery waste waters require the use of steam as a stripping source. A process which will reduce the need for a stem stripping source is thus highly desirable because of energy shortages and resultant high steam costs. Petroleum refineries usually produce a quantity of residual gas which is available at pressures of between 100 and 220 psig. Ordinarily the energy contained in this residual gas is not utilized because the gas is released to a header operating at 40–80 psig. This gas subsequently is burned in various furnaces.

OBJECTS OF THE INVENTION

A primary object of this invention is to provide an improved process for removing ammonia and hydrogen sulfide separately from refinery waste waters.

Another object of this invention is to provide a method of removing hydrogen sulfide and ammonia from refinery waste waters wherein the steam consumed in such treatment is minimized.

Another object of this invention is to maximize the ultimate recovery of hydrogen sulfide as a liquid sulfur product rather than allowing it to be discharged into the air in the form of sulfur dioxide.

Another object of this invention is to treat refinery foul waters so that they will be non-polluting when released to natural waterways.

SUMMARY OF THE INVENTION

Briefly stated, this invention in its broadest aspect comprises a process for removing dissolved hydrogen sulfide and ammonia from a refinery waste water wherein:

a. a stream of a refinery absorber gas is introduced into one end of a contacting zone;

b. a stream of the refinery waste water to be treated is introduced into the other end of said zone;

c. the two streams are flowed countercurrently through the contacting zone and are intimately mixed;

d. an effluent stream of absorber gas is removed from one end of said zone, this gas stream being enriched with hydrogen sulfide gas and containing only neglible quantities of ammonia; and e. simultaneously a waste water stream containing most of the original ammonia present but only neglible quantities of hydrogen sulfide is removed from the other end of said zone.

In a less broad aspect, our invention includes the additional step of stripping or removing the dissolved ammonia from the effluent waste water stream removed from the contacting zone.

DESCRIPTION OF THE DRAWING

The attached drawing is a process flow diagram illustrating the flow path and major pieces of equipment necessary to carrying out the method of this invention. To avoid undue complication of the drawing, auxiliary equipment such as pumps, exchangers, refluxing equipment and control valves have been omitted.

DESCRIPTION OF THE PREFERRED EMBODIMENTS

The terms "refinery waste water" or "foul water" used in this specification refer to water streams derived from petroleum refining operations which contain dissolved hydrogen sulfide and ammonia. These streams must be treated to remove the dissolved ammonia and hydrogen sulfide before they can be recycled or released.

The term "absorber gas" is a term well known to those skilled in the art of petroleum refining and is available at most typical refineries. It includes the uncondensible overhead gas derived primarily from catalytic cracking, but may include light gas from other refinery processing units such as crude oil topping units, reformers, hydrotreaters, etc. Ordinarily this gas contains hydrocarbons such as methane, ethane, ethylene, and small amounts of propane and propylene. Other constituents include hydrogen as well as inert gases such as nitrogen, carbon dioxide, carbon monoxide and oxygen. A relatively small amount of hydrogen sulfide is usually present. The gas typically has little value other than as fuel. The absorber gas, if it is burned, is usually released from some higher pressure, for example 100 psig to 220 psig, to 40–80 psig when used as a fuel and the energy available from expansion of the gas is lost.

The process of our invention may be better understood by reference to the attached drawing which depicts a preferred embodiment of the invention. In the embodiment depicted in the drawing, the refinery waste water containing hydrogen sulfide and ammonia is introduced through line 2 into liquid-gas contacting column 4 which can be filled with packing, distillation plates or other means that will effect intimate contact between countercurrent flowing streams of gas and liquid. At a point near the bottom of column 2 absorber gas is admitted through expansion valve 24 in line 6. Line 8 conducts steam into the bottom of column 4 if this is desirable. Effluent gas from column 4 is removed through line 10 to a process for concentrating the hydrogen sulfide such as by amine absorption. The gas removed in line 10 is substantially free of ammonia, that is, the concentration of ammonia will not be more than about 0.1 mole percent. The extracted hydrogen sulfide, free of ammonia, is then ready for diversion to an $SO_2$ or free sulfur plant.

The effluent water stream from column 4 is removed through line 14 and admitted to the upper part of a second column 16 which can be of a design the same as or similar to column 4. This water stream in line 14 is substantially free of hydrogen sulfide, that is, the concentration of hydrogen sulfide will not be more than about 2000 ppm. Steam is introduced through line 18 near the bottom of column 16 in sufficient quantity to heat the water to a temperature of between about 200° and about 300°F., depending on pressure. Effluent water substantially free of ammonia is removed through line 22 and can be released to a sewer, waterway, etc. Stripping steam and ammonia are removed overhead through line 20 to an incinerator or are otherwise disposed of.

As for operating conditions, the water coming through line 2 into column 4 will be at a temperature of between 100°F. and 250°F. and will contain up to between 2,000 and 40,000 ppm of hydrogen sulfide and between 1,000 and 40,000 ppm of ammonia. In column 4 the operating pressure will be between 40 psig and 80 psig and the absorber gas and hydrogen sulfide in line 10 will be removed at a temperature of about 100°F. The gas will contain a minimum of 0.1 mole percent of ammonia. The incoming absorber gas will be expanded from a pressure of between 100 psig and 200 psig across expansion valve 24 to the bottom of column 4. The water in line 14 containing dissolved ammonia will leave at a temperature between 100° and 300°F. and will contain a maximum amount of $H_2S$ of 2,000 ppm. The ratio of the volume of water to the volume of absorber gas flowed through column 4 should be between 25 and 150 ft³ of gas (measured at 60°F. and 1 atmosphere) per cubic foot of water. The amount of steam admitted through line 8 should be that needed to maintain a temperature of between 100° and 300°F. in the bottom of column 4. The temperature in column 4 where the gases and liquids are mingled, will thus be between about 100° and about 300°F.

In column 16 the operating pressure will be between 0 and 25 psig and the temperature between 210° and 270°F. The ratio of steam injected through line 18 to the water injected through line 14 should be between about 0.5 and about 2.0 pounds of steam per gallon of water.

EXAMPLE

Refinery foul water containing 14,000 ppm of sulfur in the form of dissolved hydrogen sulfide and 4,700 ppm of dissolved ammonia are flowed into the top of a stripper column at the rate of 40 gallons per minute. The temperature of the incoming water is approximately 100°F. Into the bottom of the column an absorber gas is introduced at the rate of 1 million scf per day (measured at 1 atmosphere and 60°F). This is equivalent to an hourly injection rate of approximately 41,500 scf. The gas is expanded from a line pressure of 220 psig to a pressure of 70 psig inside the bottom of the stripper column. The gas is a mixture primarily of methane, ethane, nitrogen, carbon dioxide and carbon monoxide and contains approximately 2 mole percent of hydrogen sulfide. Steam is introduced at a rate of 2,500 lb/hr to maintain the bottom temperature of the column at about 225–260°F. The steam does not function as a stripping agent since the top of the column and the vapors leaving the top of the column have a temperature of only about 100°F. The overhead vapors which are a mixture of absorber gas, water vapor and 8.0 mole percent hydrogen sulfide leave the column at a pressure of 70 psig and are carried to an amine absorption unit for extraction of the hydrogen sulfide. The effluent water from the bottom of column 4 is removed at a rate of slightly in excess of 40 gallons per minute, the excess consisting of condensed steam. The effluent water contains 1,600 ppm of sulfur in the form of dissolved hydrogen sulfide and 4,700 ppm of dissolved ammonia. It should be noted that all of the ammonia has remained in solution in the waste water and the amount of hydrogen sulfide retained is considered minimal. The effluent is carried to a conventional steam stripper operated at an internal pressure of 20 psig and a temperature of 250°F. The vapors leaving the stripper are a mixture of ammonia, water vapor and traces of hydrogen sulfide and are subsequently combusted. The sulfur dioxide emitted from the combustion is sufficiently low as to have neglible impact on the environment. The effluent water from the bottom of this second stripper has no detectable hydrogen sulfide and only a slight ammonia content. It is thus acceptable for disposal into sewers, natural waterways, etc.

The advantages of our invention are readily apparent. The substitution of absorber gas in the first stage or first column diverts hydrogen sulfide from air pollution to a recovered product. The amount of steam required is reduced substantially. Energy contained in the compressed absorber gas formerly wasted in many refineries is now fully utilized.

We claim:

1. A process for removing dissolved hydrogen sulfide from a refinery waste water containing both dissolved ammonia and hydrogen sulfide comprising;
   a. providing a waste water-gas contacting zone;
   b. introducing a refinery absorber gas at one end of said contacting zone and flowing said gas through said contacting zone at a pressure of about 40 to about 80 psig and a temperature of about 100° to about 300°F., said absorber gas being derived from catalytic cracking, crude oil topping, reforming or hydrotreating, and comprising a gas selected from the group consisting of methane, ethane, ethylene, propane, propylene, hydrogen, nitrogen, carbon dioxide and mixtures of two or more thereof;

c. introducing a refinery waste water containing up to 40,000 ppm each of dissolved ammonia and hydrogen sulfide at the other end of said contacting zone and flowing said waste water through said contacting zone countercurrently to the flow of said absorber gas in a ratio of about 25 to about 150 ft$^3$ of gas (measured at 60°F. and 1 atmosphere) per cubic foot of water;

d. removing gaseous stream from said contacting zone said stream comprising a hydrogen-sulfide enriched absorber gas stream; and e. removing a waste water stream from said contacting zone, said stream containing substantially no dissolved hydrogen sulfide and substantially all of said dissolved ammonia.

2. The process of claim 1 wherein said refinery absorber gas is expanded from a pressure of between about 100 and 220 psig prior to being introduced into said contacting zone.

3. The process of claim 1 wherein the concentration of dissolved hydrogen sulfide in said waste water is between about 2,000 and about 40,000 ppm and the concentration of dissolved ammonia in said waste water is between about 1,000 and about 40,000 ppm.

4. A process for removing dissolved ammonia and hydrogen sulfide from a petroleum refinery waste water comprising;

a. providing a waste water-gas contacting zone;

b. introducing a refinery absorber gas at one end of said zone; and flowing said gas through said zone at a pressure of about 40 to about 80 psig and a temperature of about 100° to about 300°F., said absorber gas being derived from catalytic cracking, crude oil topping, reforming or hydrotreating, and comprising a gas selected from the group consisting of methane, ethane, ethylene, propane, propylene, hydrogen, nitrogen, carbon dioxide and mixtures of two or more thereof;

c. introducing a refinery waste water containing up to 40,000 ppm each of dissolved hydrogen sulfide and ammonia at the other end of said contacting zone and flowing said waste water through said contacting zone countercurrently to the flow of said absorber gas in a ratio of about 25 to about 150 ft$^3$ of gas (measured at 60°F. and 1 atmosphere) per cubic foot of water thereby contacting said waste water with said absorber gas;

d. removing a gaseous stream from said contacting zone, said stream comprising a hydrogen-sulfide enriched absorber gas stream containing substantially no ammonia;

e. removing an ammonia enriched waste-water stream from said contacting zone, said stream containing substantially no dissolved hydrogen sulfide; and f. stripping said ammonia-enriched waste water stream to form an ammonia-water vapor gaseous effluent and a waste-water stream substantially free of ammonia.

* * * * *